B. HOSKINS.
ADDING AND NUMBER LISTING MACHINE.
APPLICATION FILED SEPT. 16, 1908.
933,453.
Patented Sept. 7, 1909.
7 SHEETS—SHEET 1.
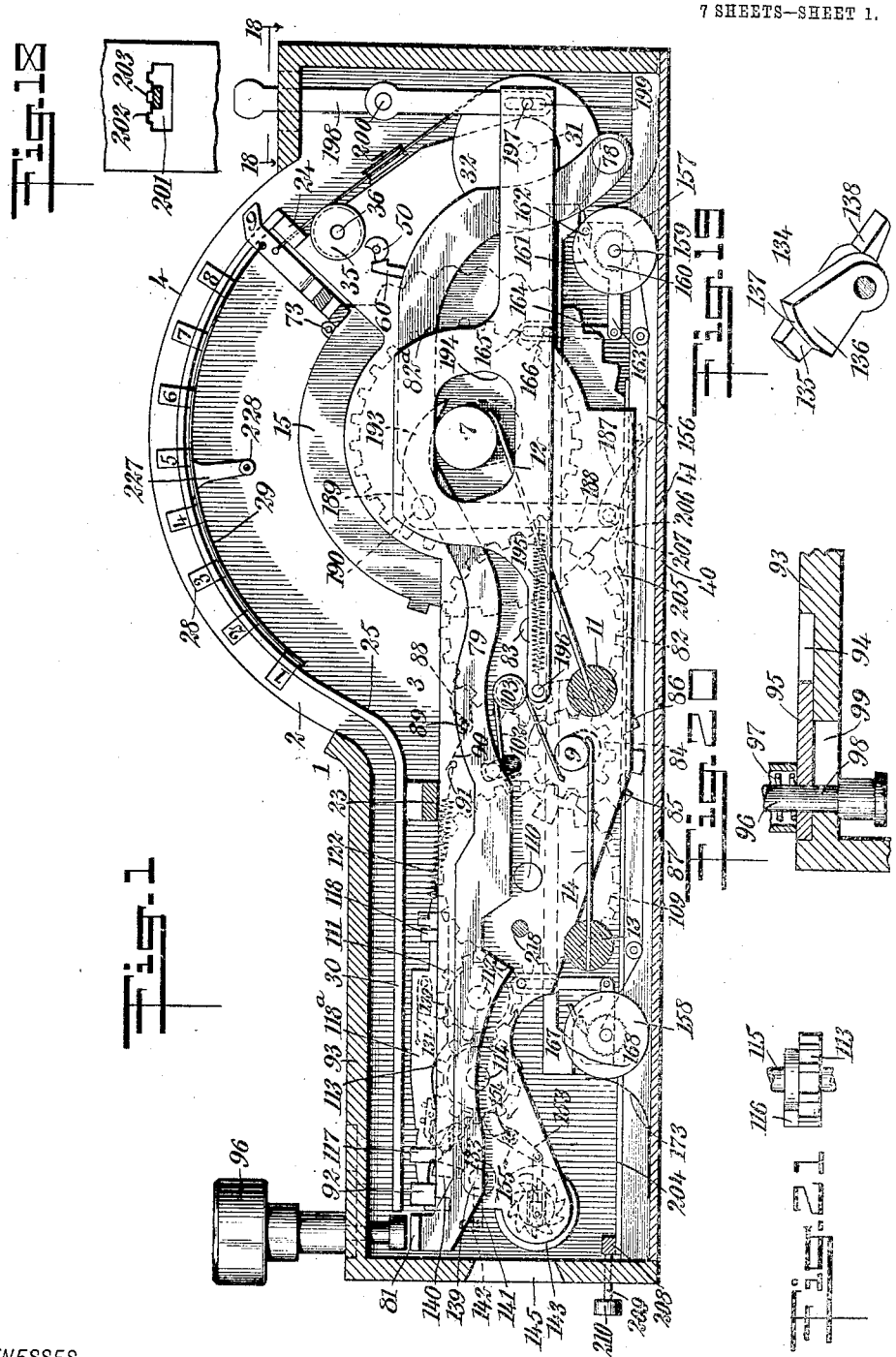
WITNESSES
INVENTOR
Benjamin Hoskins
BY
ATTORNEYS

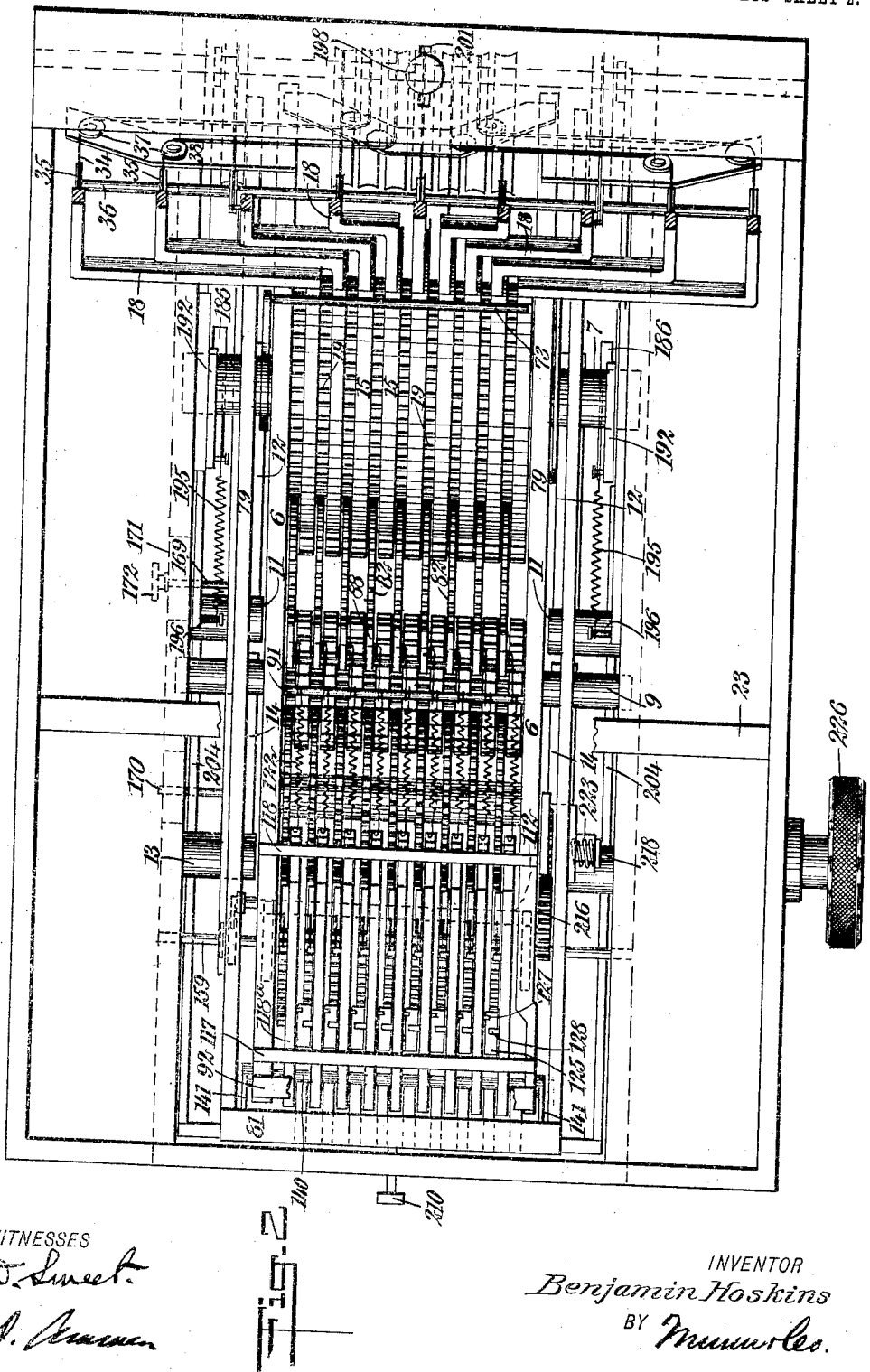

B. HOSKINS.
ADDING AND NUMBER LISTING MACHINE.
APPLICATION FILED SEPT. 16, 1908.
933,453.
Patented Sept. 7, 1909.
7 SHEETS—SHEET 3.
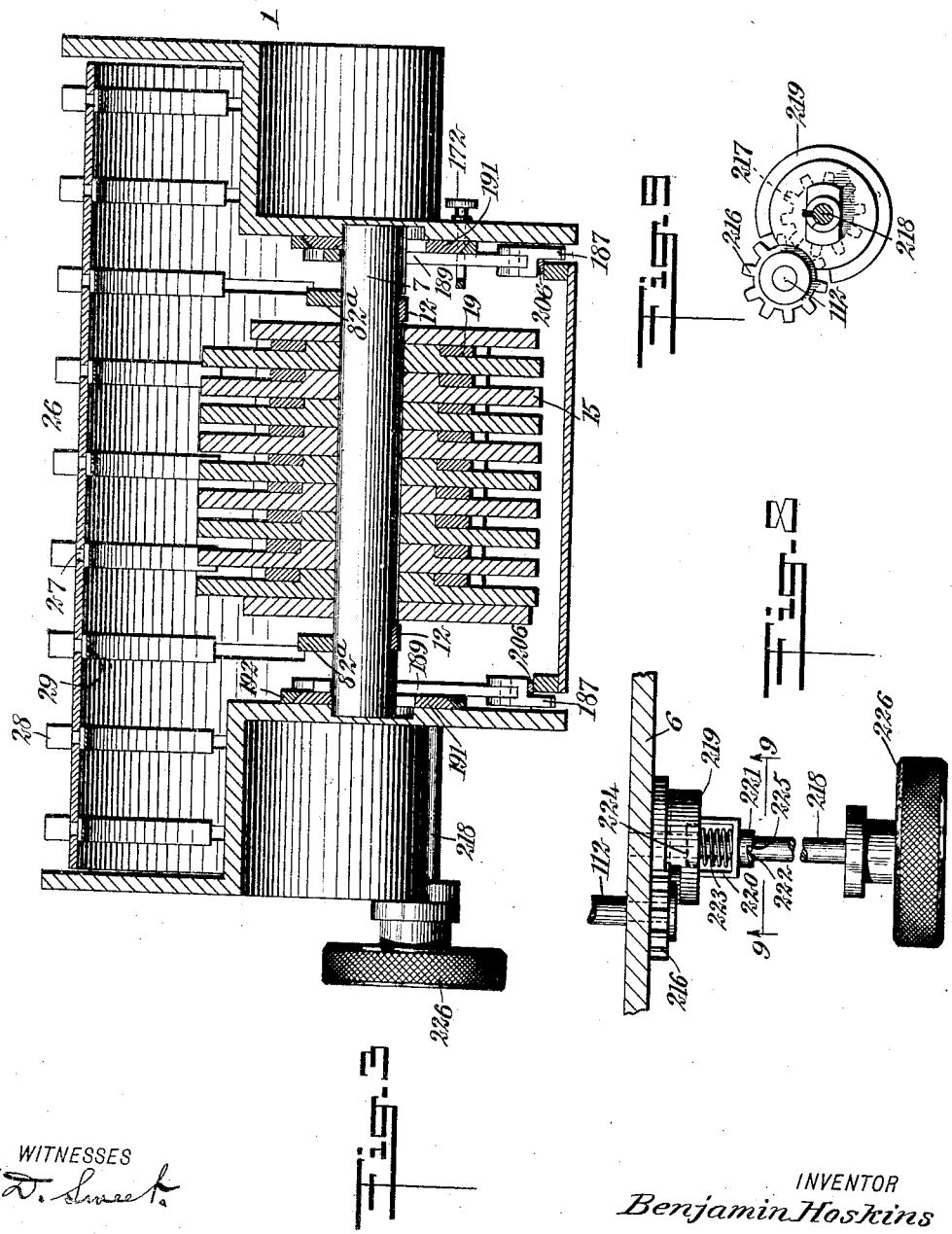
WITNESSES
INVENTOR
Benjamin Hoskins
BY Munn & Co.
ATTORNEYS.

B. HOSKINS.
ADDING AND NUMBER LISTING MACHINE.
APPLICATION FILED SEPT. 16, 1908.
933,453.
Patented Sept. 7, 1909.
7 SHEETS—SHEET 4.
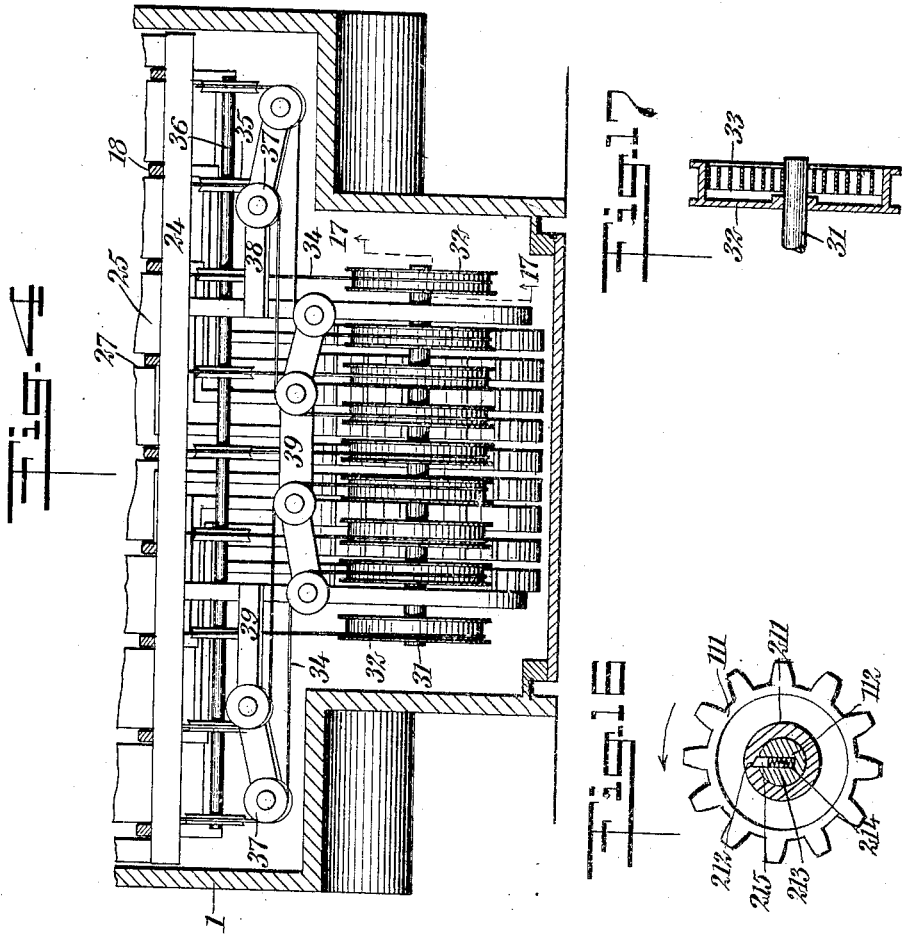
WITNESSES
INVENTOR
Benjamin Hoskins
BY
ATTORNEYS B. HOSKINS.
ADDING AND NUMBER LISTING MACHINE.
APPLICATION FILED SEPT. 16, 1908.
933,453.
Patented Sept. 7, 1909.
7 SHEETS—SHEET 5.
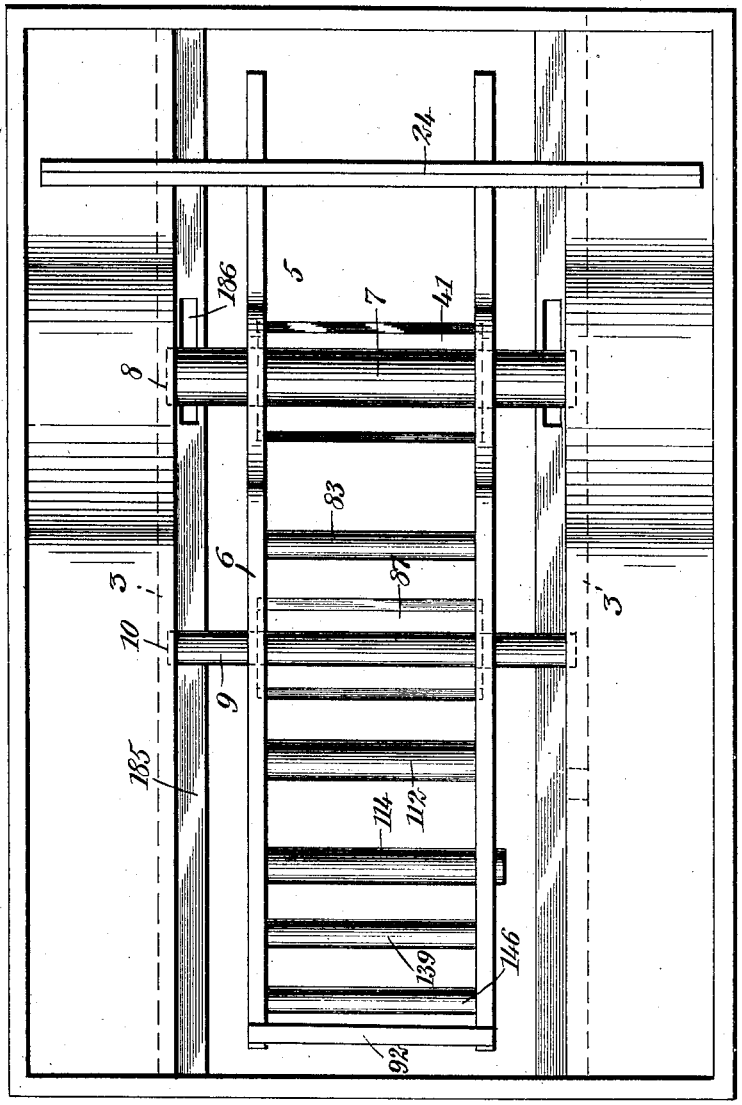
WITNESSES
F. D. Sweet.
F. D. Ammen
INVENTOR
Benjamin Hoskins
BY Munn & Co.
ATTORNEYS

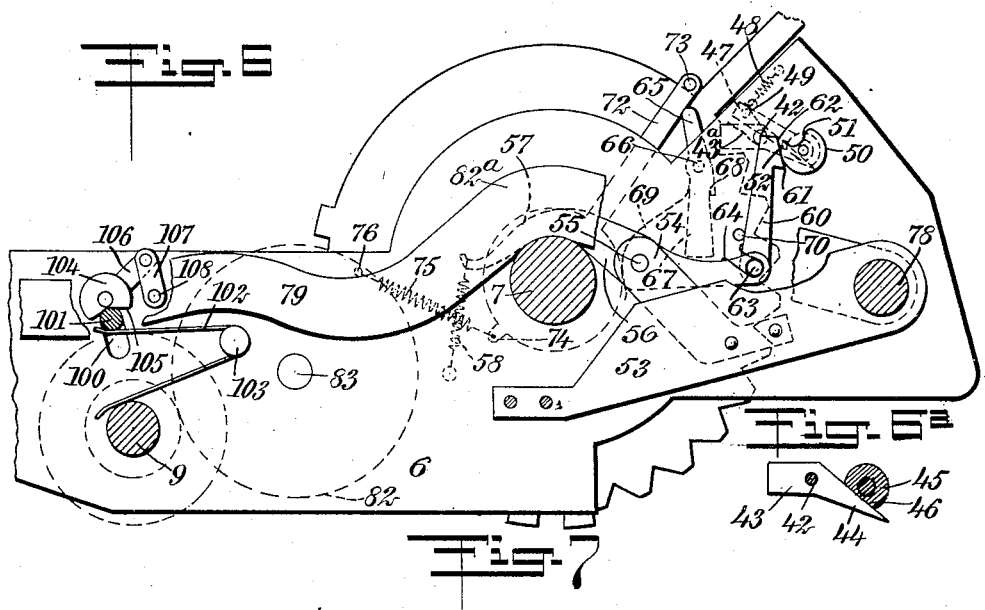
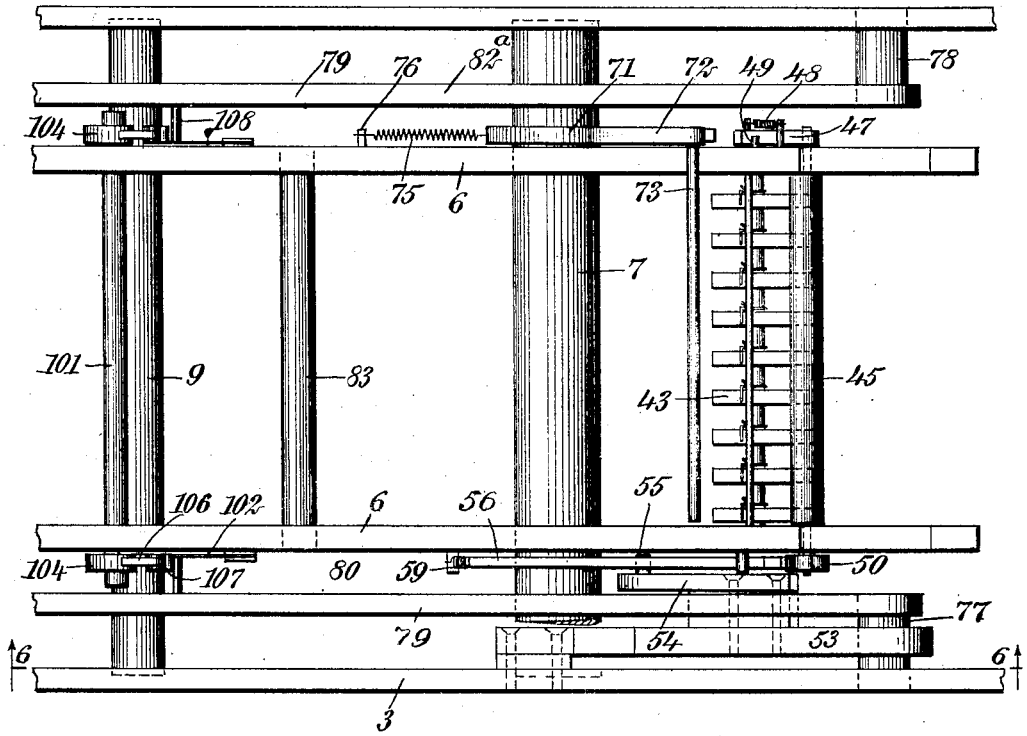

B. HOSKINS.
ADDING AND NUMBER LISTING MACHINE.
APPLICATION FILED SEPT. 16, 1908.
933,453.
Patented Sept. 7, 1909.
7 SHEETS—SHEET 7.
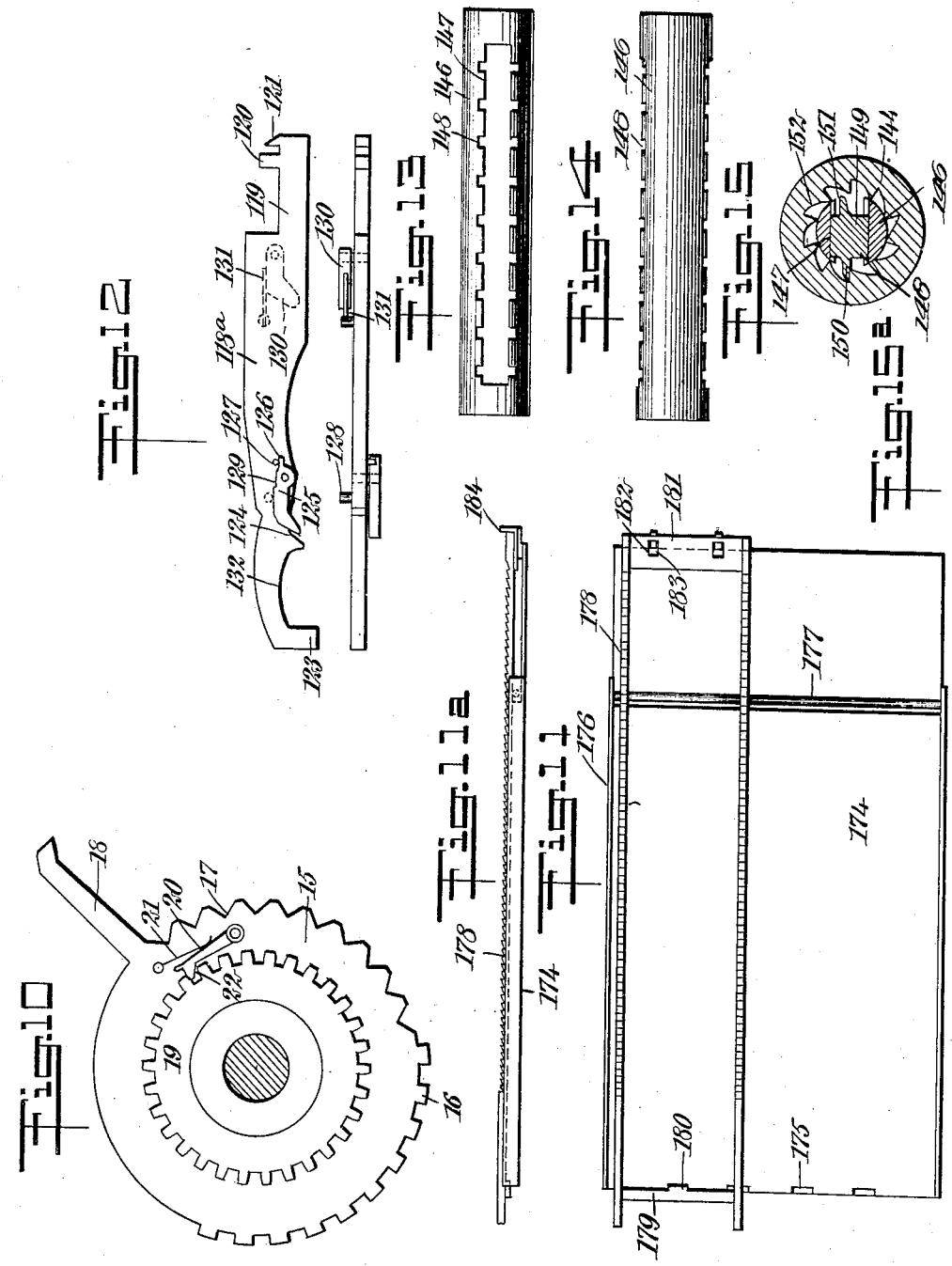
WITNESSES
INVENTOR
Benjamin Hoskins
BY
ATTORNEYS

UNITED STATES PATENT OFFICE.

BENJAMIN HOSKINS, OF SEATTLE, WASHINGTON.

ADDING AND NUMBER-LISTING MACHINE.

933,453.  Specification of Letters Patent.  Patented Sept. 7, 1909.

Application filed September 16, 1908. Serial No. 453,226.

*To all whom it may concern:*

Be it known that I, BENJAMIN HOSKINS, a citizen of the United States, and a resident of Seattle, in the county of King and State of Washington, have invented a new and Improved Adding and Number-Listing Machine, of which the following is a full, clear, and exact description.

This invention relates to adding machines which may be operated to add columns of figures, and which will print a list of the items added, and also the totals of the different columns. Such machines are used extensively in banks, counting houses, and similar institutions.

The invention constitutes an improvement on the machine patented to me October 22, 1907, Patent No. 868,666.

The object of the invention is to produce a machine of this type, having a simple construction and simple mode of operation.

While this machine has a structure embodying a depressible frame similar to that described in my patent referred to above, the invention concerns itself with improvements relating to the manner of controlling the item printing wheels, and provides improved means for locking the wheels during the printing operation. The novelty resides also in the carrying mechanism and indicator, and also in the means for feeding the machine across the tabulating sheet.

The invention further consists in the construction and combination of parts to be more fully described hereinafter and particularly set forth in the claims.

Reference is to be had to the accompanying drawings forming a part of this specification in which similar characters of reference indicate corresponding parts in all the figures.

Figure 1 is a longitudinal section through the machine taken just within the side wall thereof and looking from the right; Fig. 2 is a plan of the machine with the cover removed, certain parts being broken away and shown in section; Fig. 3 is a vertical section through the machine, taken at the location of the main shaft or item shaft; Fig. 4 is a cross section taken through the upper part of the machine at the rear thereof, and looking toward the front; Fig. 5 is a plan of the case of the machine with the cover removed, and showing the main frame supported therein with the mechanism removed therefrom; Fig. 6 is a side elevation of the forward part of the mechanism, certain parts being broken away and shown in section, on the line 6—6 of Fig. 7; this view especially illustrates the means for detaining the item wheels in their proper printing positions, and the mechanism for releasing and returning the same after printing; it also illustrates the means for locking the printing wheels against movement during the printing operation; Fig. 6$^a$ is a detail view showing one of the detent pawls in side elevation which hold the item printing wheels in position, and this view also shows a cam shaft which controls the pawls and throws the same out of operation at certain times; Fig. 7 is a plan view of the mechanism shown in Fig. 6, certain parts being broken away; in this view the item printing wheels are omitted; Fig. 8 is a horizontal cross section through the side of the case, and illustrating the means for setting the counting wheels back to their zero position; Fig. 9 is a cross section on the line 9—9 of Fig. 8, and further illustrating the zero setting mechanism; Fig. 10 is a side elevation of one of the item printing wheels, and showing the manner in which they operate to advance the adding mechanism and total printing wheels; Fig. 11 is a plan of the table upon which the machine operates, and showing the rails on which the machine advances; Fig. 11$^a$ is a side elevation of the table shown in Fig. 11; Fig. 12 is a side elevation of one of the slides of the carrying mechanism; Fig. 13 is a plan of the slide shown in Fig. 12; Fig. 14 is a front elevation of the indicator barrel at which the totals may be read at any stage in the adding operation; Fig. 15 is a plan of the indicator barrel; Fig. 15$^a$ is a cross section through the indicator barrel, and showing the means for advancing the indicator wheels; Fig. 16 is a side elevation indicating the form of the counting wheels, and illustrating the construction at the centers thereof for advancing the same by the zero setting mechanism; Fig. 17 is a cross section on the line 17—17 of Fig. 4, and illustrating the construction of the mechanism for resiliently returning the item wheels to their normal or zero position; Fig. 18 is a sectional plan taken on the line 18—18 of Fig. 1, and illustrating details of the mechanism for regulating the amount of advance or feeding movement of the machine on the tabulating sheet; Fig. 19 is a perspective showing a dog which cooperates with the carrying slides for effecting the carrying operation; Fig. 20 is a vertical section taken at the front end or foot of the case, and illustrating the manner of mounting a push button which is depressed to effect the printing operation; and Fig. 21 is a plan of one of the counting wheels.

Referring more particularly to the parts, and especially to Figs. 1 and 2, 1 represents the case of the machine, the rear portion of which is formed with an opening 2, opposite to which the side walls 3 of the case are formed with curved or arc-shaped edges 4. The lower portion and forward portion of the case are substantially of box form, as indicated in Fig. 3, but the side walls 3 are offset outwardly so as to form an enlarged upper space in the case at this point, in which space the levers of the item wheels and the button bands move. Between the side walls 3, as indicated most clearly in Fig. 5, the main frame 5 of the machine is supported. This main frame 5 comprises side plates 6 which are rigidly connected by bars and shafts at points throughout the length thereof. Near its rear portion, the frame 5 is supported upon a main shaft 7 which passes transversely thereof and has its extremities mounted in slots 8 formed in the side walls 3, as indicated. Toward the forward portion, and at an intermediate point, the main frame 5 is supported upon a total shaft 9, which passes completely through the main frame like the shaft 7, and has its ends mounted in slots 10 formed in the side walls 3, as shown. At a suitable point on the side walls 3, inwardly projecting posts or studs 11 are provided, and these studs constitute mountings for stout leaf springs 12, which project under the main shaft 7 and normally hold the same in an extreme elevated position in the slots 8. In this way these springs operate normally to hold the rear end of the main frame 5 elevated, and return it after being depressed. At another point the side walls 3 are provided with inwardly projecting posts or studs 13, and these studs constitute mountings for stout leaf springs 14, which project under the shaft 9 and hold this shaft and the forward portion of the main frame in an elevated position. These springs also return this part of the frame to an elevated position after being depressed.

Referring now especially to Figs. 1 and 3, on the main shaft 7 there are provided a plurality of item wheels, or item printing wheels 15; the form of these wheels is clearly illustrated in Fig. 10. Each wheel is of substantially circular form, and is provided on practically one-third of its circumference with elevated printing faces 16, which are provided with type, printing successively, 0, 1, 2, 3, etc., up to 9. Opposite the printing faces 16, a portion of the circumference of the item wheel is provided with V-shaped notches 17, and beyond these points, an upwardly projecting finger lever 18 is formed, which normally extends rearwardly in an inclined position, as shown. These item printing wheels are loosely mounted on the shaft 7. Adjacent to the face of each item wheel 15, there is provided an item gear 19. These gears are of smaller diameter than the bodies of the item wheels, and on the side face of each item wheel there is provided a ratchet pawl 20, which is pressed by a spring 21 into engagement with the teeth of the gear 19, as shown in Fig. 10. This ratchet pawl 20 has a tooth with an inclined rear face 22, from which arrangement it will be evident that if the lever 18 of the printing wheel is moved toward the front of the machine, it will advance its corresponding item gear. The inclined face 22 permits the item wheel to return without rotating the gear backward, as will be readily understood.

At the middle point of the main frame 5, a transverse bar 23 is provided, and a similar transverse bar 24 is provided toward the rear of the frame. This latter bar is near the location of the item levers 18, which are normally in alinement at the rear of the machine. On these bars 23 and 24, guide plates 25 are supported. The rear parts of these guide plates 25 are curved upwardly so that they form a rounded dome 26, and they are disposed apart so as to form guide slots 27. In these guide slots, I provide a plurality of sliding buttons 28, which project into the interior of the dome, and are attached to button strips 29 of flexible material, such as a light steel band. The forward portions of the guide plates 25 are formed with horizontal extensions 30, which project into the forward part or box of the case, and these extensions are depressed so as to form spaces which may receive the foremost buttons when the item levers are advanced, as in adding. In the rear part of the frame 5, I provide a transverse spring barrel shaft 31, upon which there are mounted a plurality of spring barrels 32. The construction of one of these spring barrels is clearly illustrated in Fig. 17. The barrels are loosely mounted on the shaft, and provided with coil springs 33 attached to the shaft, and which tend to rotate the spring barrels in a right-hand direction, that is, clockwise. From these spring barrels, cords 34 pass upwardly and forwardly in an inclined direction, and pass over guide pulleys 35 which are loose on a transverse guide shaft 36 mounted in the frame near the cross bar 24. Some of these guide pulleys 35 are in alinement with the spring barrels 32, but as indicated in Fig. 2, the levers 18 of the outermost printing wheels are offset outwardly so as to aline with the slots in the dome. These cords 34 are attached to the item levers, as indicated, and in order to effect the connection with the levers at the sides of the machine, these cords pass around guide pulleys 37 suitably mounted on special brackets 38 and 39, as indicated most clearly in Fig. 4. When the item wheels are in their normal position, as shown in Fig. 1, the lowermost of the printing faces 16 will be in the printing position and will print a "0," the next to the left will print a "1," the next one a "2," and so on. Directly under the item wheels, the bottom 40 of the case is provided with an item printing opening 41, as indicated most clearly in Fig. 5. By pulling the item levers 18 forwardly, the item wheels may be advanced in adding the digits of a number, and the tension springs 33 will tend to return the item wheels to their normal or zero position.

I provide means for detaining the item wheels in their advanced positions. For this purpose, in the upper portion of the frame 5, as indicated most clearly in Fig. 6, I provide a transverse pawl shaft 42, and on this shaft I provide a plurality of detent pawls, or detents 43; one of these pawls is very clearly shown in Fig. 6ª. Each pawl is in alinement with one of the item wheels, and its forward end may project into engagement with the teeth or V-shaped notches 17, as indicated in dotted lines in Fig. 6. These detents are held by springs 43ª against the wheels. These detents 43 have pointed tails 44 which project under a cam shaft 45, which cam shaft is rotatably mounted in the main frame. This cam shaft is of rounded form, but is cut away so as to form a flat face 46, which forms a seat for the upper edges of the tails 44, as indicated in Fig. 6ª. When the flat face 46 is turned toward the tails of the detents, the detents may engage with the teeth of the item wheels, but if the shaft 45 is rotated so as to bring the round side thereof against the detents, they will be held out of engagement with the item wheels. The cam shaft 45 is normally held with the flat face presented to the detents. For this purpose, on the left side of the machine, as illustrated in Fig. 7, the shaft 45 is formed with a reduced extension which projects beyond the frame, and which carries a rigid arm 47. To this arm a spring 48 is attached, which normally holds the arm against a stop pin 49, projecting from the outer side of the side plates 6, as shown. The other end of the shaft 45 is also reduced, and passes through the right-hand side plate 6, beyond which it is provided with a rigid hook disk 50. The edge of this hook disk is formed with a notch 51, a portion of which forms a hook 52 near the forward side of the disk, as shown.

On the inner face of the right side wall 3 of the case, a bracket plate 53 is rigidly attached, and extends rearwardly in an upwardly inclined direction. It is provided with a rigid bracket 54 attached on its inner face, as indicated in Fig. 7. Upon this bracket 54, on a pivot stud 55, there is mounted a releasing lever 56 which is formed with a curved tail 57, which projects over and engages the upper side of the main shaft 7, as indicated. This tail of the lever is held down upon the shaft by means of a spring 58 which is attached to a pin 59 on the outer side of the adjacent side plate 6. To the other end of the releasing lever 56, a hook 60 is pivotally attached, and this hook extends upwardly so as to present a tooth 61 with an inclined upper edge 62. This inclined edge 62 normally rests against the forward edge of the hook disk 50, as indicated in Fig. 6. At the pivot pin 63 which connects the hook 60 to the releasing lever, a small spring 64 is provided, which normally holds the hook in the position shown. It is sufficient to state at this time that in the printing operation, when the shaft 7 is depressed, the tooth 61 of the hook 60 engages the hook 52 of the hook disk so as to rotate the cam shaft 45 to bring its rounded face against the detents. In this way they are drawn out of engagement with the item wheels.

I provide means for locking the cam shaft in this position. For this purpose I provide on the left-hand side plate 6, a latch 65 which is pivoted at 66 and provided with a downwardly extending tail 67. In the rear edge of this tail, a notch 68 is provided, and against the forward side of the tail, a spring 69 thrusts. This spring is a leaf spring, and normally tends to hold the tail in a rearmost position and against a stop pin 70 in the side plate. This notch or shoulder 68 is in the path of the arm 47 so that when the arm swings downwardly, it will snap under the shoulder so that the latch will hold the arm in this position. When the arm is in this position, the spring 48 will be extended and the round side of the cam shaft 45 will be presented to the detents. On the shaft 7, just outside of the left-hand side plate, I provide a collar 71 which has an upwardly extending arm 72. To this arm 72 a return bar 73 is rigidly attached, and this return bar projects across the interior of the case just above the item wheels. It is adapted to engage the forward edges of the finger levers 18, as indicated in Fig. 6. The lower side of the collar is provided with a downwardly projecting ear 74, to which a spring 75 is attached. This spring is a coil spring, and its forward end is attached to a pin 76 on the outer face of the side plate, as shown. This spring 75 maintains the return bar 73 against the forward edges of the finger levers and operates to return the item wheels to their normal or zero position after the item or number has been set up and printed.

Through the aforesaid bracket plate 53, a pivot stud 77 extends inwardly from the right side wall of the case, and opposite to this pivot stud there is a similar pivot stud 78, which extends inwardly from the opposite side of the case. On these pivot studs there are pivotally mounted side bars 79, which constitute parts of a depressible frame 80, the said frame being completed by a transverse bar 81 which is at the extreme forward end of the case, as indicated in Fig. 1. These side bars 79 are offset upwardly in the vicinity of the shaft 7 so as to form yokes 82$^a$ which rest upon the upper side of the shaft, as will be readily understood.

The item gears 19 mesh respectively with idler gears or main idlers 82 which are carried upon a transverse shaft 83 mounted in the main frame, as shown. These idlers 82 mesh in turn with pinions 84 which are loosely mounted upon the aforesaid shaft 9. These pinions 84 are rigid respectively with total printing wheels 85, and these printing wheels have ten elevated printing faces 86, which are disposed equidistant. These total printing wheels are disposed directly above a total printing opening 87 which is formed in the bottom of the case, as indicated very clearly in Fig. 5. In order that the total printing wheels will stop in their proper position for printing, I provide the idlers 82 with detent pawls 88 which are mounted upon a transverse bar 89 and pressed toward the idlers by small springs 90, said springs being coiled around the bar 89 and thrusting back against a transverse bar 91.

At the forward end of the main frame, a cross bar 92 is provided, which is just to the rear of the bar 81, and at the same level. Just above this point, the upper wall or cover 93 of the case is formed with a recess or groove 94, and in this groove is mounted a sliding plate 95, in which there is mounted a depressible push button 96, said button being normally held in an elevated position by means of a spring 97, as indicated in Fig. 20. The stem 98 of this button passes downwardly through a slot 99, which arrangement permits the sliding plate 95 to be slid rearwardly so that the stem 98 can come into position over the cross bar 92. When in this position, the cross bar 92 can be depressed by depressing the push button. When in its normal position, depressing the push button will depress the depressing frame 80. When the depressing frame 80 is forced down, the side bars 79 press downwardly upon the shaft 7, and in this way the entire rear end of the main frame will be depressed until the printing faces of the item wheels come into contact with the tabulating sheet laid under the machine. When the rear end of the frame is depressed in this manner, a rotation takes place around the axis of the total shaft 9; on the other hand, if the push button is depressed when in its rearward position, that is when over the cross bar 92, the forward end of the main frame will be depressed so that the printing faces of the total printing wheels will come against the tabulating sheet under the machine.

I provide means for locking the wheels against rotation when printing in the manner suggested. For this purpose, referring especially to Figs. 1 and 6, I provide the side plates 6 of the main frame with slightly inclined slots 100, and in these slots which are in alinement, there is disposed a depressible locking bar 101. This bar is normally held in an elevated position by a coil spring 102, the coil whereof is disposed around a stud 103 fixed on the side plate, the lower end of this spring thrusting against the upper side of the shaft 9, as shown. On the outer sides of the side plates 6, just over this locking bar 101, I provide cams 104. These cams simply consist of disks having flat or obtuse V-shaped notches 105 in the lower edges thereof. In the normal position of the mechanism, the spring 102 operates to hold the locking bar 101 in these notches. Each cam 104 is provided with an upwardly extending inclined arm 106, and this arm is connected by a link 107 with the inner sides of the side bars 79. For this purpose the side bars 79 are provided with long pins or studs 108 which extend inwardly, as shown in Fig. 7. It should be understood that the total printing wheels should advance by a step-by-step movement, and the arrangement is such that the locking bar 101 always lies opposite to the depression or blank space between two of the printing faces or teeth 86. From this arrangement it will be evident that if the locking bar 101 is depressed in the slot 100, it will engage the total printing wheels so as to lock them against rotation. The cams 104 afford means for depressing this locking bar during the printing of an item or a total. In this connection it should be observed that in printing an item, the depressing frame 80 moves downwardly, and the downward movement of its side bars 79 draws downwardly the arms 106. This will bring the unbroken edge of the cams against the upper sides of the locking bar 101, which will depress the bar, as will be readily understood. In printing a total, the forward end of the main frame will be depressed. In this case the depressing frame 80 will remain stationary and the main frame will be depressed. The pivots of the cams 104 will rotate the cams in the same manner, but in an opposite direction to the former movement, and the cams will then depress the locking bar as before. This locking bar not only operates to lock the wheels against being moved by the printing operation, but it also operates to hold the wheels against displacement when the item wheels are being returned to their normal or zero position by the return bar 73.

It should now be understood that on account of the ratchet pawls 20 on the item wheels coöperating with the item gears, each advance of an item wheel will advance one of the total wheels a corresponding amount, but the total wheels cannot return with the item wheels so that the total wheels receive the aggregate advance of the individual item wheels, at least they would do so if it were not for the carrying mechanism, which will now be described. This carrying mechanism operates to advance the total printing wheels of the next higher denomination from a lower denomination when these wheels have reached their "tens" position. This carrying mechanism comprises a plurality of gear trains or carrying trains, one of which is driven from each of the total pinions or gears 84. Each of these trains comprises a large idler or idler gear 109, which are all loosely mounted upon a transverse shaft 110. These idler gears 109 mesh with idler pinions 111, which are all loosely mounted upon a transverse shaft 112. These shafts are mounted in the side plates 6 of the main frame, as will be readily understood. These idler pinions or idlers 111 mesh with counting wheels 113 which are all loosely mounted upon a shaft 114; one of these counting wheels 113 is clearly illustrated in Fig. 21. Each of these wheels has a hub 115 of reduced diameter. These wheels have ten teeth, and one tooth of each wheel is extended laterally the full width of the hub so as to form a special or carrying tooth 116. Forward of the counting wheels 113, the main frame is provided with a transverse guide bar 117, and a similar guide bar 118 is provided toward the rear. In these guide bars there are guided a plurality of carrying slides 118ª, the construction and form of which is very clearly shown in Fig. 12. They consist of elongated plates with reduced necks 119 at their rear ends, which slide under the guide bar 118. The rear ends of these necks are provided with upwardly projecting fingers 120 which limit the forward movement of the slides, as will be readily understood. At the rear of the fingers 120, each slide is formed with a spur 121, to which there is attached a spring 122. These springs 122 extend toward the rear and are attached to the aforesaid cross bar 91. The forward end of each slide is formed with a downwardly projecting toe 123, and a short distance to the rear of this toe, each slide is provided with a notch or depression 124 in its lower edge. On the side of each slide, and on that side which is disposed toward the wheels of lower denomination, that is, toward the right, a releasing pawl 125 is pivoted, and the point of this pawl projects downwardly near the notch 124. Each of these releasing pawls has a small rearwardly projecting tail 126 which normally rests against a stop pin 127, which normally limits the forward movement of the pawl, as will be readily understood. On the upper side of each slide, that is, on the side toward the wheels of high denomination, a releasing pin 128 is provided. When the slides are all arranged in position side by side, the releasing pin of each slide of lower denomination projects over the upper edge of the releasing pawl 125 of the slide of next higher denomination, and this arrangement exists throughout the entire system of slides.

As indicated in Fig. 12, the rear portion of each releasing pawl 125 is formed with a notch or depression 129 in its upper edge. From this arrangement it follows that if a slide of one denomination should move toward the rear, its releasing pin 128 will "uncover" or release the pawl of the slide of next higher denomination, so that this pawl can move, in other words, the releasing pawls 125 are normally locked against rising unless the counting wheels are at carrying position. In addition to this, each slide at its rear end is provided on its upper side, that is, on the side toward the higher denomination wheels, with a ratchet pawl 130. This ratchet pawl engages with the idler pinion 111 of the next higher train, and is held in engagement therewith by a small spring 131. As indicated in Fig. 12, the lower edge of each slide is provided with a deep notch 132 between the toe 123 and the notch 124. The purpose of this notch will appear more fully hereinafter.

Mounted transversely in the main frame, just beneath the notches 124 and the pawls 125, I provide a dog shaft 133. On this dog shaft I provide a plurality of double dogs 134, one of which is clearly illustrated in Fig. 19. Each of these dogs comprises a finger 135 which is adapted to engage the notch 124, and in addition to this finger, each dog comprises a wing or segment 136 of greater width than the finger, and the periphery or curved outer edge 137 of this wing lies against the under side of the point of the pawl 125. Opposite to the finger, the dog is provided with a tail 138, and these tails project into the space near the counting wheels 113, and extend into the paths of the carrying teeth 116. From this arrangement, at each complete revolution of a counting wheel, its corresponding double dog will be rotated downwardly so as to release the slide, and the pawl 125 carried thereby. On account of the fact that the wing 136 is of substantially double the width of the finger 135, it requires about twice the angular movement of the dog to release the pawl as it does to release the carrying slide. The arrangement is such that when the counting wheels are moving from their "8" to their "9" position, the corresponding slide will be released by the finger 135. A further movement from the "9" to the "10" position of this counting wheel will completely release the slide, and the slide will then be drawn rearwardly by the spring 122. In moving in this way, the ratchet pawl 130 slips over one tooth of the corresponding idler pinion 111.

I provide automatic means for giving a forward movement to the slide when the depressing frame is depressed. For this purpose, in the forward part of the main frame there is provided a transverse rock shaft 139, and on this rock shaft there is mounted an upwardly projecting rocking wing 140 which extends upwardly into the aforesaid enlarged notches 132 behind the toes 123. The hub of this rocking wing which is loose on the shaft, is provided with an arm or lever 141, and this lever is connected by a short link 142 with the side bars of the depressing frame. From this arrangement, when the depressing frame is forced downwardly by the push button 96, the wing 140 moves forwardly and engages all the sprung or released slides so as to draw them forwardly into their normal position. In bringing them forwardly in this way, each sprung slide advances the idler 111 of the train of next higher denomination through one tooth space. In this way the adding movement passes from one denomination to the next higher. The forward movement of the slides is not prevented by the double dog, as this dog rocks slightly so as to permit the slide and pawl 125 to pass over it after the slides are advanced; in this way the double dogs hold them again as before. Special attention is called to the manner of controlling the pawl 125 of the slide of higher denomination from the pin 128 from the slide of lower denomination.

While the description above applies to the slides generally, it should be understood that in the case of the unit slide the releasing pawl 125 is omitted, and the segment of the units double dog is omitted so that a single dog remains consisting of the finger 135. This dog is arranged to release itself from the notch 124 of the unit slide in the "9" to "10" movement of the units counting wheel.

I provide an indicator 143, the indicator wheels 144 of which are visible through a peep opening or window 145 in the forward wall of the case, as indicated in Fig. 1. This indicator shows the total of numbers added. The body of the indicator is formed of a barrel or enlarged shaft 146, as indicated in Figs. 14 to 15ª. This barrel is provided with a longitudinal horizontal slot 147. At equidistant points this slot is provided with grooves 148 extending in the front and rear direction of the machine. In these grooves 148, slide blocks 149 are respectively mounted; the form of these blocks is shown in Fig. 15ª. Each block is formed on its forward face with a spur 150, and on its rear face with a similar spur 151. Rotatably mounted on the barrel or shaft 146, I provide the aforesaid wheels 144. These wheels are provided with internal ratchet teeth 152, having inclined faces and abrupt faces. The blocks 149 are adapted normally to occupy a forwardly disposed position, as indicated in Fig. 15ª. At this time the forward spur 150 will lie in one of the notches between the ratchet teeth 152, and when the indicator wheel is in this position, an inclined face of a tooth space will be presented opposite to the spur 151. From this arrangement, if the block 149 is drawn rearwardly, its spur 151 will strike this inclined face and advance the indicator wheel through half of its necessary movement, that is, through a half space. Upon the return movement of the slide the spur 150 coöperates with an inclined face of a tooth of the ratchet so as to rotate the wheel through the other half of its movement. In this way by complete reciprocation of one of the blocks its corresponding indicator wheel will be advanced through one number space, that is, from "7" to "8" or "8" to "9", etc.

I provide means for actuating the slide blocks 149 from the counting wheels 113. For this purpose I provide a plurality of rocking levers 153, which are all pivotally mounted on a transverse shaft 154. These levers have inclined lower arms which are connected by links 155 pivotal with the blocks, as indicated in Fig. 1. The upper arms of these levers normally lie in the spaces between the teeth of the counting wheels. Evidently, with each advance through one tooth space, a counting wheel will give its corresponding block a complete reciprocation as suggested. The numbers on the faces of the indicator wheels are arranged so that they will read the same as the numbers on the printing faces of the total printing wheels.

In the lower portion of the case just above the bottom thereof, there is provided a transfer ribbon 156, such as typewriting ribbon, and the ends of this ribbon wrap upon ribbon spools 157 and 158. These spools are mounted on transverse shafts 159, the ends of which are supported in the side walls of the case. Each spool is provided with a ratchet wheel 160, and a pawl carrier 161. This pawl carrier is provided with a pawl 162 which is adapted to engage with the teeth of its corresponding ratchet wheel, and is provided with an upwardly projecting tail, as indicated. These pawl carriers 161 have horizontally extending arms 163. These arms are pivotally attached to vertically extending links 164. The upper ends of said links are provided with slots 165 through which pass pins 166 respectively carried by the inner faces of the side plates 6 of the main frame. The teeth of the ratchet wheels 160 project in the same direction, but the feeding movement given to the spools alternates, that is, when the left-hand spool is feeding, the right-hand spool is not. I provide means for enabling the pawls to be thrown in or out of operation, for which purpose I provide a longitudinally moving shift bar 167. The ends of this bar are provided with inclined edges 168 which are adapted to engage the tails of the pawls alternately so as to throw them out of operation. In the position shown in Fig. 1, the right-hand pawl is out of operation, while the left-hand pawl is operative. This shift bar 167 is supported on stems 169 and 170, which extend through slots 171 formed in the side wall of the case, as indicated in Fig. 2. The bar 167 is provided with a thumb head 172 by means of which the shift bar may be slid to either of its extreme positions. The slots in the links 164 are provided so as to prevent the links from limiting the free and independent movement of the depressing frame and main frame. In connection with these pawl carriers, springs are provided. In order to provide tension for the ribbon, small leaf springs 173 are provided, which press against the edges of the spools, as indicated.

I provide means for automatically feeding the machine up and down the tabulating sheet. For this purpose the tabulating sheet is laid upon a table 174, which is illustrated in Figs. 11 and 11ª. This table is of rectangular form and is provided with a plurality of notches 175 in the rear edge thereof. It is formed with upwardly turned flanges 176 at its side edges, and these flanges extend to a point near the forward edge of the table. They are connected at this point by a transverse shaft 177, on which there is slidably mounted a rack frame composed of parallel ratchet bars or racks 178. These bars are connected at their rear ends by a cross bar 179 having a downwardly disposed projection 180 which is adapted to engage with any one of the notches 175 so as to hold the rack frame in a plurality of different positions on the table. This enables a number of parallel columns to be printed on the same tabulating sheet. The forward ends of the racks 178 are connected by a cross plate or cross head 181. This cross head is provided with two small slots 182, in which small clips 183 are mounted to slide longitudinally with respect to the racks. The ends of the racks are disposed a slight distance above the surface of the table, and these clips 183 are adapted to rest on the edge of the table, as indicated in Fig. 11ª, so as to support the rack frame at this point. Beyond the cross head 181, these clips have upwardly projecting toes 184 which are adapted to be struck by the forward end of the case as it moves toward the front of the table. In this way the clips are shifted outwardly in their slots so as to come beyond the forward edge of the table; the center of gravity of the adding machine will at this time be forward of the shaft 177 so that the rear end of the rack frame will rise automatically. In this way the projection 180 automatically disengages itself from its notch and the entire rack frame with the machine can then be slid transversely on the shaft 177 so as to enable the projection 180 to engage the next notch. In this connection it will be observed that the teeth of the racks 178 incline toward the forward edge of the table, so that the machine will print items in a column, the bottom of the column being disposed in the direction toward which the teeth project. These racks 178 are received in channels 185 which extend longitudinally near the side walls of the case, as indicated most clearly in Fig. 5. Near the position of the main shaft 7, these channels 185 are provided with slots 186 which expose the teeth of the racks to be engaged by a feed pawl 187, as indicated in Fig. 1. This feed pawl is pivotally mounted upon a vertical arm 188 of the feed lever 189. There are two of these levers, and they are pivotally mounted at 190 to feed plates 191 which are mounted to slide in a horizontal direction between guide plates 192 attached to the inner faces of the side walls of the case, as indicated most clearly in Fig. 3. These levers 189 have rearwardly projecting toes 193, the lower edges of which engage the upper sides of the main shaft 7, as indicated in Fig. 1. In order that the guide plates 192 will retain the feed plates, the meeting edges of these plates are beveled, as indicated in Fig. 3. The feed plates are formed with enlarged openings or eyes 194 which receive the shaft 7 and permit a free movement thereof. The arms 188 of the feed levers are constrained toward a forward position by springs 195 which are attached to them, as indicated, the forward ends of the springs being attached to pins 196 projecting from the forward ends of the feed plates. The rear ends of the feed plates are connected by a cross rod 197. This cross rod is engaged by the lower end of an adjusting lever 198, which lever has a slot 199 engaging the rod, as shown. This lever is pivotally mounted at 200 within the case, and its upper end extends to the upper wall and through a slot 201, as indicated in Fig. 18. This slot is provided with notches 202 which are adapted to be engaged by a tooth 203 formed on the side of the lever. This lever is slightly resilient so that if deflected laterally the teeth 203 can be disengaged from any one of the notches so as to permit the lever to be moved toward the front or rear. By moving this lever, the feed plates can be shifted forwardly or rearwardly, and this will change the position of the pivot pin 190 of the feed lever with respect to the shaft 7. In the operation of the machine, after the item printing movement the shaft 7 will descend as described. This permits the springs 195 to give the feed pawl 187 a forward movement. On the upward or return movement of the shaft 7, the feed levers will be moved by the toes 193 so as to advance the entire machine. By shifting the position of the pivot point 190 of the feed levers with respect to the shaft, by means of the lever 198, evidently the feed movement or "throw" of the feed pawls 187 will be regulated as desired.

I provide means for disengaging the feed pawls 187 from the racks so as to permit the machine to be moved freely over the table. For this purpose, on the upper sides of the channels 185 in the bottom of the case, I provide releasing bars 204. These are simple flat bars which extend longitudinally of the channel from a point near the forward wall of the case. Their rear ends are bent upwardly so as to form cam faces 205, and these cam faces engage the toes of releasing levers 206 which are pivoted to the case at 207. These releasing levers project under the lower edges of the feed pawls 187, as indicated most clearly in Fig. 3. The bars 204 are connected by a cross bar 208, and this cross bar is provided with a stem 209 having a head 210 disposed outside of the case at the forward wall thereof. The stem passes through the forward wall, as shown. From this arrangement it will be evident that by pushing the head or button inwardly, the feed pawls 187 will be raised.

I provide means for setting all of the counting wheels back to their zero position. The mechanism for this purpose is illustrated most clearly in Figs. 8, 9, and 16. Fig. 16 represents one of the idlers 111. Each of these idlers is formed with a hub 211, and the bore of this hub is provided with a notch 212 which has an inclined face and an abrupt face, as indicated. The idler shaft 112 is provided with a transverse bore or pocket 213, in which there is received a small helical spring 214, and this spring presses a pawl 215 which is set in the bore 213 so that it projects beyond the surface of the shaft. These pawls are adapted to engage with the notches 212, as indicated in Fig. 16 when the wheels are in the zero position. It will be evident that the wheels 111 can rotate in the direction of the arrow shown in Fig. 16, that is, in a forward direction without their rotation being interrupted by the pawls 215. However, by rotating this shaft 112 in the same direction as the arrow, the pawls 215 will engage all of the notches whatever be their position, and will in this way bring all the wheels into alinement and advance them in unison. In order to rotate the shaft 112, I provide the devices shown in Figs. 8 and 9. For this purpose the shaft 112 is formed with a reduced end which passes through the right side plate 6 of the main frame and carries rigidly a pinion 216. Meshing with this pinion 216 there is provided a pinion 217 which is carried upon a longitudinal sliding stem 218. This stem will rotate the pinion 217 but can be slid longitudinally therein, as will be readily understood. The inner end of this stem 218 passes through the plates 6 and it is guided in a small gear box 219 having a bracket 220 projecting therefrom. This bracket is formed with a collar 221 having a notch 222 in the outer edge thereof. This bracket is open like a yoke, and receives a spring 223 which thrusts against a collar 224 on the stem 218 so that it tends to hold the stem 218 in its innermost position. The stem 218 is provided with a laterally projecting pin 225 which is adapted to engage the notch 222, as shown. This notch and pin are employed for the purpose of indicating the position in which the stem should be left in order that the counting wheels will be in their zero position. The stem 218 passes outwardly through the side wall of the case through a special slot, and is provided with a thumb head 226 by means of which the stem can be rotated. When it is desired to put the counting wheels in a zero position, this stem is pulled outwardly so as to disengage the pin 225, and the stem is then rotated toward the right. This will rotate all of the wheels 111 in a forward direction, and when the stem 218 has made a complete revolution, the spring 223 will pull the pin 225 back into the notch 222. The counting wheels will then all be in alinement in a zero position.

In order to guide the cords 34 when the finger levers 18 are drawn forwardly, I provide the under side of the dome 26 with a plurality of downwardly projecting brackets 227, as indicated most clearly in Fig. 1. These brackets are provided at their lower ends with guide rollers 228, and the cords will rest upon the upper surfaces of these guide rollers and be guided thereupon when the finger levers are moved over near their most forward position.

The mode of operation of the entire machine will now be described: The tabulating sheet is laid upon the table 174, and the machine advances down the same as the adding and printing operation progresses. The items to be added are then set up by advancing the levers 18. When the levers 18 are advanced in this way, the tapes or flexible bands 29 carrying the buttons 28 will slide downwardly on the guide plates 25 and into the forward part of the case. These buttons 28 are numbered consecutively from "1" to "9". If for instance, the digit "4" is to be added in the "tens" place, the second lever from the right of the machine will be advanced until the button 4 is just visible at the base of the dome. In this way the digits are all set to present the item which is to be added. The push button 96 is then depressed, which depresses the frame 80; as the side bars 79 of this frame move downwardly, they depress the main shaft 7 and the item wheels 15 carried thereby. In this way the printing faces of the item wheels which are alined over the item printing opening 41, will be pressed down upon the transfer ribbon and the tabulating sheet. The downward movement of the shaft 7 permits a downward movement of the lever 56 by its spring 58. This raises the hook 60 so that it engages the hook 52 of the hook disk 50. When the shaft 7 returns in its upward movement it moves the lever 56 which rotates the disk 50. The rotation of this disk 50 rotates the cam shaft 45 and locks it with its round side against the tails of the detents 43, which hold the item wheels in their advanced positions. As soon as this occurs, the return bar 73 actuated by the spring 75 begins to return the item wheels to their zero position. When it arrives at the position in which it is shown in Fig. 6, it strikes the latch 65 and releases the arm 47 of the cam shaft 45. In this way the detents are held away from the item wheels so as to permit their return by the return bar, but after the item wheels are all returned, the spring 48 returns the cam shaft or bar 45 to its normal position and the detents engage with the item wheels as before. The downward movement of the depressing frame locks the total printing wheels through the medium of the links 107 which rotate the cams 104 and force the locking bar 101 downwardly in its slot 100. In passing downwardly in this way the locking bar engages between the teeth of the total printing wheels and holds them fixed, while the return bar is returning the item wheels. After each item is printed the upward movement of the shaft 7 operates through the feed levers 189 to move the feed pawls 187 which engage the racks, and in this way the machine is advanced automatically. The degree of advance is regulated by the position of the lever 189, as was fully described in the body of this specification. Advancing the item wheels operates through ing wheels effect the carrying from one total printing wheels through the medium of the idlers 82. Gear trains beyond the total printing wheels effect the carrying from one total printing wheel of one denomination to that of the next higher denomination. In the operation of these carrying trains, each total printing wheel drives an idler gear 109 which in turn drives an idler pinion 111, and these pinions 111 drive the counting wheels 113. When the total printing wheel of any train receives the movement which changes its printing face from "8" to "9", the carrying tooth 116 of the corresponding counting wheel will operate the double dog 134 so as to release the slide 118ª at the notch 124. The movement from "9" to "10" or from "9" to "0" of the total printing wheel will then give the double dog a further movement sufficient to release the releasing pawl 125 which is pivoted to the slide. This completely releases the slide, which is then pulled rearward by its spring 122. The rearward movement of the slide 118ª brings its ratchet pawl 130 into engagement with the idler 111 in a rearward position so that if the slide is advanced again to its former position it will advance the train of next higher denomination through one tooth space. When the depressing frame 80 is moved downwardly by the push button 96, it operates through the link 142 and through the wing 140 to advance all the slides 118ª to their normal forwardly disposed position. This advances all the trains which were to be advanced by the carrying mechanism.

Through the operation of the indicator lever 153, the indicator wheels are advanced from the counting wheels 113 so that they will present at the window 145 the same number which will be printed by the total printing wheels. When the total is to be printed, the push button 96 is slid rearwardly so as to depress the forward end of the main frame. This produces a rotation about the shaft 7, and the printing faces of the total printing wheels impress the tabulating sheet through the transfer ribbon at the total printing opening 87. This printing movement of the main frame operates to lock the total printing wheels against rotation by means of the locking bar 101 which will be depressed in its slot 100 by the cams 104 through the medium of the links 107, as will be readily understood.

The mode of operation of the machine in traversing the table will be clearly understood from the minute description given in the body of this specification.

The drawing represents the machine as having nine finger levers, so that this machine can add into hundred millions, but there may be more or less of these levers as desired.

Having thus described my invention, I claim as new and desire to secure by Letters Patent,—

1. In a machine of the class described, in combination, a depressible frame, a plurality of item wheels mounted thereupon having printing faces, a plurality of total wheels mounted upon said frame and also having printing faces, means supported by said frame for detaining said wheels in advanced positions, means for depressing one part of said frame to print from said item wheels, and means for depressing another part of said frame to print from said total printing wheels.

2. In a machine of the class described, in combination, a depressible frame, a transverse shaft carried thereby, a plurality of item wheels rotatably mounted on said shaft and having printing faces, a total shaft mounted in said frame, a plurality of total wheels mounted on said total shaft and having printing faces, means for advancing said total wheels from said item wheels, means supported by said frame for detaining said wheels in advanced positions, means for depressing said frame adjacent to said first shaft to print from said item wheels, and means for depressing said frame at another point to print from said total wheels.

3. In a machine of the class described, in combination, a depressible frame, a plurality of item wheels carried thereby and adapted to print the items set up, a plurality of total wheels adapted to print the totals set up, means for depressing said frame toward either end thereof so as to print from said item wheels or said total wheels, and automatic means for locking said wheels against rotation when said frame is depressed.

4. In a machine of the class described, in combination, a depressible frame, a plurality of item wheels carried thereby and adapted to print items set up, a plurality of total wheels carried by said frame and adapted to print the totals set up, a locking bar adapted to lock said wheels against rotation, means for depressing said frame to print from said item wheels or said total wheels, and means for advancing said locking bar to its locking position automatically when said frame is depressed.

5. In a machine of the class described, in combination, a main frame, a plurality of item printing wheels supported in said frame and adapted to print the items set up, a plurality of total printing wheels supported in said frame adapted to print the totals set up, a depressing frame adapted to depress said first frame near said item printing wheels to print therefrom, and means controlled by said depressing frame for locking said item printing wheels against rotation when depressed.

6. In a machine of the class described, in combination, a main frame, a plurality of item printing wheels supported in said frame and adapted to print the items set up, a plurality of total printing wheels supported in said frame adapted to print the totals set up, a depressing frame adapted to depress said first frame near said item wheels to print therefrom, and means for locking said total wheels against rotation during the depressing of said first frame.

7. In a machine of the class described, in combination, a depressible frame, a plurality of printing wheels carried thereby, a locking bar adapted to interlock with said printing wheels to lock the same against rotation, means for normally holding said locking bar in a withdrawn position, a depressing frame adapted to depress said first frame, and means for advancing said locking bar through the medium of said depressing frame to lock said printing wheels against rotation.

8. In a machine of the class described, in combination, a depressible frame, a plurality of printing wheels carried thereby, a locking bar guided upon said frame and adapted to lock said printing wheels against rotation, a depressing frame adapted to depress said first frame, and means actuated by said depressible frame for advancing said locking bar to its locking position.

9. In a machine of the class described, in combination, a depressible frame, a plurality of printing wheels carried thereby, a locking bar guided on said frame and adapted to lock said printing wheels against rotation, a depressing frame adapted to depress said first frame to print from said wheels, cams engaging said locking bar and adapted to advance the same to lock said printing wheels, and means connecting said depressing frame with said cams whereby the depression of said depressing frame will lock said printing wheels.

10. In a machine of the class described, in combination, a depressible frame, an item shaft mounted in said frame, a plurality of item wheels carried by said item shaft and adapted to print when said frame is depressed at its rear part, a total shaft, a plurality of total wheels carried thereby and adapted to print when said frame is depressed toward its forward part, a depressing frame adapted to depress the rear part of said depressible frame, and means for depressing the forward part of said depressible frame.

11. In a machine of the class described, in combination, a depressible frame, a plurality of item wheels carried thereby, a plurality of total wheels carried by said frame, a depressing frame adapted to depress said first frame adjacent to said item wheels to print therefrom, means for depressing said depressible frame at said total wheels to print therefrom, means connecting said depressing frame and said depressible frame, and means for locking all of said printing wheels against rotating when depressed for printing.

12. In a machine of the class described, in combination, a depressible frame, an item shaft, a plurality of item wheels mounted thereupon, a depressing frame engaging said item shaft to depress said frame to print from said item wheels, a total shaft mounted in said depressible frame, a plurality of total wheels mounted on said total shaft and adapted to print totals, a locking bar adapted to lock all of said printing wheels against rotation, and means for advancing said locking bar to its locking position during the printing action of said item wheels or said total wheels.

13. In a machine of the class described, in combination, a depressible frame, an item shaft mounted therein, a plurality of item wheels mounted on said item shaft, a total shaft mounted in said frame, a plurality of total wheels on said total shaft, a depressing frame engaging said item shaft and adapted to depress the same to print from said item wheels, and means for depressing said depressible frame at a point remote from said item shaft to print from said total wheels.

14. In a machine of the class described, in combination, a depressible frame, an item shaft mounted therein, a plurality of item wheels mounted on said item shaft, means for resiliently supporting said frame at said item shaft, a total shaft mounted in said frame, a plurality of total wheels mounted thereupon, means for resiliently supporting said frame at said total shaft, a depressing frame adapted to depress said depressible frame at said item shaft, and means for depressing said depressible frame at said total shaft.

15. In a machine of the class described, in combination, a depressible frame, an item shaft mounted therein, a plurality of item wheels carried thereby, means for resiliently supporting said depressible frame at said item shaft, said depressible frame being rotatable at said item shaft, a total shaft mounted in said depressible frame, a plurality of total wheels carried thereby, means for resiliently supporting said frame at said total shaft, said frame being rotatable in said total shaft, means for depressing said frame at said item shaft to print from said item wheels, and means for depressing said frame at said total shaft to print from said total wheels.

16. In a machine of the class described, in combination, a depressible frame, an item shaft mounted therein, a plurality of item wheels mounted on said item shaft, means for resiliently supporting said frame at said item shaft, a total shaft mounted in said frame, a plurality of total wheels mounted on said total shaft, means for resiliently supporting said frame at said total shaft, a depressing frame adapted to depress said first frame at said item shaft to print from said item wheels and affording means for rotating said depressible frame on said total shaft, and means for depressing said depressible frame at said total shaft to print from said total wheels.

17. In a machine of the class described, in combination, a depressible frame, an item shaft mounted therein, a plurality of item wheels mounted on said item shaft, means for resiliently supporting said frame at said item shaft, a total shaft mounted in said frame, a plurality of total wheels mounted on said total shaft, means for resiliently supporting said frame at said total shaft, means for rotating said depressible frame on said item shaft to print from said total wheels, and means for rotating said frame on said total shaft to print from said item wheels.

18. In a machine of the class described, in combination, a depressible frame, an item shaft mounted therein, a plurality of item wheels mounted on said item shaft, means for resiliently supporting said frame at said item shaft, a total shaft mounted in said frame, a plurality of total wheels mounted on said total shaft, means for resiliently supporting said frame at said total shaft, means for rotating said depressible frame on said item shaft to print from said total wheels, means for rotating said frame on said total shaft to print from said item wheels, and means for locking said wheels against rotation during their printing movement.

19. In a machine of the class described, in combination, a depressible frame, an item shaft carried thereby, a plurality of item wheels on said item shaft, means for resiliently supporting said frame at said item shaft, a total shaft mounted in said frame, a plurality of total wheels on said total shaft, means for resiliently supporting said frame at said total shaft, a locking bar adapted to engage said total wheels to lock the same and said item wheels against rotation, means for normally holding said locking bar in a withdrawn position, means for rotating said depressible frame on said item shaft to print from said total wheels, means for rotating said depressible frame on said total shaft to print from said item wheels, and automatic means for advancing said locking bar to lock said printing wheels when said depressible frame rotates about the said shafts.

20. In a machine of the class described, in combination, a depressible frame, an item shaft mounted therein, a plurality of item wheels on said item shaft, means for normally supporting said frame at said item shaft, a total shaft mounted in said frame, a plurality of total wheels carried on said total shaft, said item wheels and said total wheels being adapted to print, when depressed, means for normally supporting said frame at said total shaft, means for rotating said depressible frame on said item shaft to print from said total wheels, and means for rotating said depressible frame on said total shaft to print from said item wheels.

21. In a machine of the class described, in combination, a depressible frame, an item shaft mounted therein, a plurality of item wheels mounted on said item shaft, a total shaft, a plurality of total wheels mounted on said total shaft, means for rotating said frame on either of said shafts to print respectively from said total wheels and from said item wheels, a locking bar guided on said depressible frame and adapted to lock said total wheels against rotation, and means for advancing said locking bar to its locking position when said frame is rotated upon either of said shafts.

22. In a machine of the class described, in combination, a depressible frame, an item shaft mounted in said frame, a plurality of item wheels mounted on said item shaft, means for resiliently supporting said item shaft, means for guiding said shaft downwardly, a total shaft mounted in said frame, a plurality of total wheels mounted thereupon, means for resiliently supporting said total shaft, means for guiding said total shaft in a downward direction, a depressing frame engaging said item shaft to rotate said depressible frame on said total shaft to print from said item wheels, and means for rotating said depressible frame on said item shaft to print from said total wheels.

23. In a machine of the class described, in combination, a depressible frame, a total shaft mounted therein, an item shaft mounted therein, a plurality of item wheels mounted on said item shaft, a plurality of total wheels on said total shaft, a depressing frame engaging said item shaft and adapted to rotate said depressible frame on said total shaft to print from said item wheels, means for rotating said depressible frame on said item shaft to print from said total wheels, a locking bar adapted to engage with said total wheels to lock said wheels against rotation, and means for guiding said locking bar toward said total wheels, means for normally holding said locking bar in a withdrawn position, cams engaging said locking bar and adapted to advance the same when rotated, said cams being rotatably mounted on said depressible frame and links connecting said cams with said depressing frame for rotating said cams.

24. In a machine of the class described, in combination, a depressible frame, an item shaft mounted therein, a plurality of item wheels on said item shaft, a total shaft mounted in said frame, a plurality of total wheels mounted on said total shaft, means for resiliently supporting said shafts, means for rotating said depressible frame on either of said shafts, to print respectively from said item wheels and from said total wheels, a locking bar near said total wheels, said frame having slots guiding said locking bar into engagement with said total wheels to lock the same against rotation, means for normally holding said locking bar in a withdrawn position, and means for advancing said locking bar with the rotation of said depressible frame.

25. In a machine of the class described, in combination, a case, a depressible frame mounted therein, an item shaft mounted in said frame, means for guiding said shaft downwardly in said case, a plurality of item wheels carried by said item shaft, means for resiliently supporting said item shaft, a total shaft mounted in said frame, means for guiding said total shaft downwardly in said case, a plurality of total wheels mounted on said total shaft, means for resiliently supporting said total shaft, a member adapted to lock said item wheels and said total wheels against rotation, automatic means for advancing said member to its locking position, means for rotating said depressible frame on said item shaft to print from said total wheels, and means for rotating said depressible frame on said total shaft to print from said item wheels.

26. In a machine of the class described, in combination, a case, a depressible frame, an item shaft mounted in said depressible frame, means for guiding the ends of said shaft in said case, means for resiliently supporting said item shaft, a plurality of item wheels carried by said item shaft, a total shaft mounted in said frame, means for guiding the ends of said total shaft in said frame, resilient means for supporting said total shaft, a locking bar mounted in said frame, means for normally holding said locking bar in a withdrawn position, a depressing frame engaging said item shaft and adapted to rotate said depressible frame on said total shaft to print from said item wheels, cams mounted on said depressible frame and adapted when rotated to advance said locking bar to lock said total wheels, links connecting said depressing frame with said cams to rotate the same, and means for rotating said depressing frame on said item shaft to print from said total wheels.

27. In a machine of the class described, in combination, a case having slots in the side walls thereof, a frame mounted in said case, shafts passing through said frame and having their ends guided in said slots respectively, printing wheels carried by said shafts, leaf springs mounted in said case, thrusting upwardly against the under side of said shafts and affording means for normally holding said shafts elevated in said slots, and means for rotating said frame about either of said shafts to print from said printing wheels respectively.

28. In a machine of the class described, in combination, a depressible frame, a shaft mounted therein, a plurality of item wheels mounted on said shaft, means for advancing said item wheels individually, a plurality of detents for coöperating with said item wheels to lock the same in their advanced position, means for depressing said frame to print from said item wheels, means actuated by the depressing movement for releasing all of said detents, and means for returning said item wheels.

29. In a machine of the class described, in combination, a frame, a shaft mounted therein, a plurality of printing wheels mounted on said shaft, means for advancing said printing wheels individually, detents engaging said printing wheels to hold the same in their advanced positions, a cam-shaft engaging said detents and adapted to release the same when rotated, means for printing from said wheels, means actuated by the printing movement for rotating said cam-shaft to release said detents, and means for returning said printing wheels.

30. In a machine of the class described, in combination, a frame, a shaft mounted therein, a plurality of printing wheels, means for advancing said printing wheels individually, detents affording means for holding the said printing wheels in their advanced positions, releasing means for disengaging said detents, means for actuating said releasing means by the printing movement, means for locking said detents in their releasing position, means for returning said printing wheels, and means actuated by said last means for reengaging said detents with said printing wheels.

31. In a machine of the class described, in combination, a frame, a shaft mounted therein, printing wheels mounted on said shaft, means for advancing said printing wheels, detents engaging said printing wheels to hold the same in their advanced positions, means for returning said printing wheels to their normal position, means for simultaneously releasing said detents from said printing wheels during their return movement, means for locking said detents in their released position while said wheels are being returned, means for releasing said last means by said returning means, and means for printing from said wheels.

32. In a machine of the class described, in combination, a frame, a shaft mounted therein, a plurality of printing wheels on said shaft, a plurality of detents engaging said printing wheels to lock the same in their advanced position, a cam-shaft engaging said detents and affording means when rotated for releasing the same, means for depressing said frame to print from said wheels, means for rotating said cam-shaft and maintaining the same in a locked position with said detents released, means for returning said printing wheels, and means for releasing said cam-shaft actuated by said returning means.

33. In a machine of the class described, in combination, a frame, a shaft mounted therein, a plurality of printing wheels mounted on said shaft and adapted to be advanced, a plurality of detents engaging said printing wheels for holding the same in their advanced position, a transverse cam-shaft having a flat face normally lying adjacent to said detents and permitting the same to engage said wheels, said cam-shaft having another face adapted to engage said detents to release the same when said cam-shaft is rotated, means for printing from said wheels, means for rotating said cam-shaft actuated by the printing movement, and means for returning said printing wheels.

34. In a machine of the class described, in combination, a frame, a shaft mounted therein, a plurality of printing wheels on said shaft, a plurality of detents normally engaging said wheels to hold the same in their advanced positions, a cam-shaft having a flat face and a rounded face, means for normally holding said cam-shaft with said flat face disposed near said detents, means for depressing said frame to print from said wheels, means actuated by the printing movement for rotating said cam-shaft, means for holding said cam-shaft in position to maintain said detents released from said printing wheels, means for returning said printing wheels, and means actuated thereby to release said cam-shaft.

35. In a machine of the class described, in combination, a frame, a shaft mounted therein, a plurality of printing wheels mounted on said shaft, detents coöperating with said printing wheels to hold the same in their advanced positions, a member engaging all of said detents and adapted to hold the same in a withdrawn position releasing said printing wheels, locking means for holding said member in a position to release said detents, a return bar for returning said printing wheels and engaging said last means to release said member.

36. In a machine of the class described, in combination, a frame, a shaft mounted therein, a plurality of printing wheels mounted on said shaft, a plurality of detents engaging said printing wheels to lock the same in their advanced positions, a cam-shaft lying adjacent to said detents, means for normally holding said cam-shaft in a position permitting said detents to engage said printing wheels, means for rotating said cam-shaft to release said detents, a member for returning said printing wheels, and means for locking said cam-shaft in a releasing position for said detents, said last means being in the path of said returning member whereby said detents will be permitted to engage said printing wheels when all of said printing wheels have been returned.

37. In a machine of the class described, in combination, a frame, a shaft mounted therein, a plurality of printing wheels mounted on said shaft, detents engaging said printing wheels for holding the same in their advanced positions, a rotatable cam-shaft adjacent to said detents, normally permitting said detents to engage said printing wheels, means for depressing said frame to print from said wheels, means for rotating said cam-shaft to release said detents, a return bar for returning said printing wheels, means for maintaining said cam-shaft in its releasing position for said detents during the return of said printing wheels, said last means being released by said return bar.

38. In a machine of the class described, in combination, a frame, a shaft mounted therein, a plurality of printing wheels mounted on said shaft and adapted to be advanced, detents engaging said printing wheels for holding the same in their advanced positions, a cam-shaft engaging said detents and adapted to release the same when rotated, means for depressing said frame to print from said wheels, a hook actuated when said frame is depressed to engage said cam-shaft, and affording means for rotating the same to release said detents, and means for returning said printing wheels while said detents are released.

39. In a machine of the class described, in combination, a frame, a shaft mounted therein, a plurality of printing wheels mounted on said shaft and adapted to be advanced, detents coöperating with said printing wheels for holding the same in their advanced positions, a cam-shaft disposed adjacent to said detents and adapted to release the same when rotated, means for depressing said frame to print from said wheels, a hook actuated by the depressing movement and adapted to rotate said cam-shaft, means for locking said cam-shaft in a position to release said detents, a return bar for returning said printing wheels, and means for releasing said cam-shaft through the medium of said return bar.

40. In a machine of the class described, in combination, a frame, a shaft mounted therein, a plurality of printing wheels mounted on said shaft and adapted to be advanced, detents coöperating with said wheels to hold the same in their advanced position, a cam-shaft normally permitting said detents to engage said printing wheels, means for depressing said frame to print from said wheels, means actuated by the depressing movement to rotate said cam-shaft, an arm carried by said cam-shaft, a latch adapted to engage said arm to lock said cam-shaft in its releasing position, a return bar for returning said wheels and adapted to engage said latch to release said arm, and means for normally holding said cam-shaft in its releasing position.

41. In a machine of the class described, in combination, a depressible frame, a shaft mounted therein, a plurality of printing wheels carried on said shaft and adapted to be advanced, detents engaging said printing wheels to hold the same in their advanced positions, a cam-shaft engaging said detents to release the same, a releasing lever having a fixed support and engaging said shaft, a member carried by said releasing lever and adapted to rotate said cam-shaft when said shaft is depressed, means for depressing said frame and said shaft, and means for returning said printing wheels, said cam-shaft affording means for holding said detents in their releasing position when said printing wheels are being returned.

42. In a machine of the class described, in combination, a frame, a shaft mounted therein, a plurality of printing wheels on said shaft, detents coöperating with said printing wheels in their advanced positions, a rotatable cam-shaft affording means for releasing said detents, means for depressing said frame to print from said printing wheels, a lever having a fixed pivotal support and adapted to be actuated when said frame is depressed, a hook carried by said lever and adapted to rotate said cam-shaft to hold it in its releasing position for said detents, means for latching said cam-shaft in its releasing position, a return bar for said printing wheels, and means for releasing said latching means by said return bar.

43. In a machine of the class described, in combination, a depressible frame, a shaft carried thereby, a plurality of printing wheels carried by said shaft and adapted to be advanced individually, detents for holding the said printing wheels in their advanced positions, a cam-shaft adapted to rotate and affording means for releasing said detents from said printing wheels, a lever resting on said shaft, a hook carried by said lever and adapted to engage said cam-shaft to rotate the same, means for depressing said frame and said shaft, means for latching said cam-shaft in a releasing position for said detents, a return bar for returning said printing wheels, and means for releasing said cam-shaft through the medium of said return bar.

44. In a machine of the class described, in combination, a depressible frame, a shaft mounted therein, a plurality of printing wheels carried by said shaft, detents coöperating with said printing wheels to hold the same in their advanced positions, a cam-shaft adapted when rotated to release said detents, a lever having a fixed support and engaging said shaft, whereby said lever will rock when said shaft is depressed, a hook carried by said lever, said cam-shaft having a hook disk adapted to be engaged by said hook to rotate said cam-shaft, a latch for holding said cam-shaft in a releasing position for said detents, a return bar for returning said printing wheels adapted to engage said latch to release said cam-shaft, means for normally holding said cam-shaft in its releasing position for said detents, and means for depressing said frame to print from said wheels.

45. In a machine of the class described, in combination, a frame, a plurality of wheels mounted in said frame and having levers adapted to advance said wheels according to the digits to be added, flexible bands carried by said levers and adapted to advance therewith, buttons carried by said bands and bearing digit numbers, and means for guiding said bands and said buttons.

46. In a machine of the class described, in combination, a frame, a plurality of wheels mounted in said frame and having levers adapted to advance said wheels according to the digits to be added, flexible bands carried by said levers and adapted to advance therewith, buttons carried by said bands and bearing digit numbers, means for guiding said bands and said buttons, means tending to return said wheels, and means for holding said wheels in their advanced positions.

47. In a machine of the class described, in combination, a case having an opening in the rear part thereof, a frame mounted in said case and projecting upwardly through said opening, a plurality of wheels mounted on said frame and having levers adapted to advance the same lying in said opening, flexible bands connected with said levers and carrying numbered buttons, and means for guiding said buttons and said bands on said frame, said buttons affording means for determining the amount of advance given to said wheels.

48. In a machine of the class described, in combination, a case having an opening in the rear portion thereof, a frame mounted in said case and having a dome formed in said opening, wheels carried by said frame and having levers adapted to advance the same according to the digits added, flexible bands attached to said levers, numbered buttons carried by said bands, and means for guiding said buttons and said bands on said dome.

49. In a machine of the class described, in combination, a case having an opening in the rear portion thereof, a frame mounted in said case and having a dome formed in said opening, wheels carried by said frame and having levers adapted to advance the same according to the digits added, flexible bands attached to said levers, numbered buttons carried by said bands, means for guiding said buttons and said bands on said dome, said dome having an extension concealed in the forward part of said case, and means for guiding said bands and buttons upon said extension.

50. In a machine of the class described, in combination, a case, a frame mounted in said case, a plurality of wheels mounted in said frame and having levers adapted to advance said wheels, flexible bands attached to said levers and advancing therewith, numbered buttons carried by said bands, means for guiding said buttons and said bands on said frame, cords attached to said levers, and spring barrels receiving said cords and tending to return said levers.

51. In a machine of the class described, in combination, counting wheels, printing wheels coöperating therewith, spring-controlled members for advancing the counting wheels of higher denomination from the counting wheels of lower denomination, means for releasing said movable members by said counting wheels, means for moving said printing wheels to print therefrom, and means actuated by the printing movement for returning said movable members.

52. In a machine of the class described, in combination, counting wheels, printing wheels coöperating therewith, a depressible frame affording means for printing from said printing wheels, movable members, springs tending to advance said movable members, means for effecting a carrying movement through said movable members from the counting wheels of lower denomination to the counting wheels of higher denomination, and means for returning said movable members by the depression of said frame.

53. In a machine of the class described, in combination, a plurality of counting wheels, a plurality of slides, springs tending to advance said slides, means for normally detaining said slides, means actuated by said counting wheels for releasing said slides, printing wheels coöperating with said counting wheels, a depressible frame adapted to be moved to print from said printing wheels, and means actuated by said depressible frame for returning said slides.

54. In a machine of the class described, in combination, a plurality of counting wheels, a plurality of slides corresponding thereto, springs tending to advance said slides, means for normally detaining said slides, means for releasing said slides by said counting wheels, means for advancing the slides of higher denomination by the slides of lower denomination, printing wheels coöperating with said counting wheels, a depressible frame adapted to be moved to print from said printing wheels, a rocking wing adapted to engage said slides to return the same, and mechanism connecting said rocking wing with said depressible frame for returning said slides by the printing movement.

55. In a machine of the class described, in combination, a plurality of counting wheels, an indicator consisting of a plurality of indicating wheels having ratchet teeth, slide blocks having spurs engaging said ratchet teeth to advance said indicator wheels, and means for actuating said blocks from said counting wheels.

56. In a machine of the class described, in combination, a plurality of counting wheels, a plurality of indicator wheels having internal ratchet teeth, slide blocks guided transversely with respect to said indicator wheels and having spurs engaging said ratchet teeth to advance said indicator wheels, and means for reciprocating said blocks from said counting wheels.

57. In a machine of the class described, in combination, a plurality of counting wheels, a plurality of indicator wheels corresponding thereto and having internal ratchet teeth, slide blocks guided transversely of said indicator wheels having spurs on the opposite ends thereof adapted to engage the inclined portions of said ratchet teeth to advance said indicator wheels, links connecting with said slide blocks, and levers connected with said links and actuated by said counting wheels.

58. In a machine of the class described, in combination, an indicator shaft, a plurality of indicator wheels rotatably mounted thereon, said indicator wheels having internal ratchet teeth, slide blocks guided transversely in said shaft and having spurs adapted to engage said ratchet teeth to advance said indicator wheels, a plurality of counting wheels, and means for reciprocating said slide blocks actuated by said counting wheels.

59. In a machine of the class described, in combination, an indicator shaft having a longitudinal slot therein, transverse guide grooves formed in said slot, a plurality of indicator wheels rotatably mounted on said shaft and having internal ratchet teeth, slide blocks sliding in said grooves and having spurs adapted to engage said teeth to advance said indicator wheels, a plurality of counting wheels, and means for reciprocating said slide blocks from said counting wheels.

60. In a machine of the class described, in combination, a table, a feed rack disposed upon said table, a case running upon said rack, a depressible frame within said case, a feed lever mounted on said case and adapted to be moved when said frame is depressed, printing wheels actuated by the depression of said frame, a feed pawl carried by said feed lever engaging said rack, and means for actuating said feed lever when said frame is depressed.

61. In a machine of the class described, in combination, a table, a feed rack disposed upon said table, a case running upon said rack, a depressible frame within said case, a feed lever mounted on said case and adapted to be moved when said frame is depressed, printing wheels actuated by the depression of said frame, a feed pawl carried by said feed lever engaging said rack, means for actuating said feed lever when said frame is depressed, and means for adjusting the amount of movement of said feed levers.

62. In combination, a table, a feed rack mounted thereupon, a case adapted to advance on said table longitudinally of said rack, a depressible frame mounted in said case and carrying printing wheels, means for depressing said frame to print from said wheels, a feed lever having its fulcrum upon said case and having a feed pawl engaging said rack, means for actuating said feed lever when said frame is depressed, and means for adjusting the position of the fulcrum of said feed lever to change the amount of feed movement.

63. In combination, a table, a feed rack mounted thereupon, a case, a depressible frame mounted in said case, a member moving with said frame, a feed lever having a toe engaging said member, a feed pawl carried by said feed lever engaging said rack and adapted to advance said case when said frame is depressed, and printing wheels adapted to print when said frame is depressed.

64. In combination, a table, a feed rack resting thereupon, a case movable on said table longitudinally of said rack, a depressible frame in said case and having a shaft, printing wheels carried by said frame and adapted to print when said frame is depressed, a feed plate mounted on said case, a feed lever pivotally mounted on said feed plate and having a toe engaging said shaft, a feed pawl carried by said feed lever and engaging said feed rack, and means for adjusting the position of said feed plate.

65. In combination, a table, feed racks lying thereupon, a case, a depressible frame within said case, feed levers pivotally mounted at the sides of said case and having toes adapted to be actuated by the depression of said frame, and feed pawls carried by said feed levers and engaging said racks.

66. In combination, a table, a feed rack lying thereupon, a case movable on said table longitudinally of said rack, a feed lever having a feed pawl engaging said rack to advance said case, means for actuating said feed lever, and a member at the front of said case affording means for raising said pawl to disengage the same from said rack.

67. In combination, a table, a feed rack lying thereupon, a case moving on said table longitudinally of said rack, a depressible frame within said case, printing wheels carried by said frame and adapted to print when said frame is depressed, feed levers mounted in said case and actuated by the depressing of said frame, feed pawls carried by said levers engaging said racks to advance said case, and means at the front of said case for disengaging said pawls from said rack.

68. In a machine of the class described, in combination, a case, a depressible frame mounted therein, printing wheels carried by said frame, spools mounted in said case and having a web of transfer material passing therebetween and under said printing wheels, ratchets and pawls for advancing said spools respectively, a shifting bar adapted to hold either of said pawls out of engagement with its corresponding ratchet, and means for actuating said pawls by said depressible frame.

69. In a machine of the class described, in combination, a case, a depressible frame mounted therein, printing wheels carried by said frame and adapted to print when said frame is depressed, a pair of spools, ratchets and pawls in connection with said spools, pawl carriers supporting said pawls, and links connecting said pawl carriers with said frame and having slots therein permitting a certain movement of said frame without affecting said pawl carriers.

70. In combination, a table, a rack frame mounted on said table, means for guiding said rack frame transversely of said table and pivotally supporting said rack frame, means for interlocking said rack frame at one end thereof with said table to prevent lateral shifting thereof, a case moving on said table and longitudinally of said rack frame, and means actuated by said case for releasing said rack frame from said table to permit a transverse movement thereof.

71. In combination, a table, a transverse shaft, a rack frame sliding and rocking on said shaft, means whereby said rack frame may engage said table, a case moving on said rack frame, and means actuated by said case for releasing said rack frame from said table to permit a transverse movement upon said shaft.

72. In combination, a table, a transverse shaft mounted thereupon, a rack frame sliding and rocking on said shaft, means at one end of said rack frame for engaging said table to prevent the transverse movement of said rack frame, members at the other end of said rack frame normally supporting the same on said table, and a case moving on said rack frame and adapted to engage said members and operated by gravity to raise the opposite end of said frame to release the same from said table.

73. In combination, a table, a rack frame pivotally supported on said table at an intermediate point on the length of said frame, a case traveling on said rack frame and adapted to cross the point of support therefor on said table, and means operated by the weight of said case for raising the opposite end of said frame.

74. In combination, a table, a tilting frame mounted thereon and movable transversely thereon, a case running on said frame, means whereby said case may tilt said frame upon arriving at one end, and means at the other end of said frame for interlocking said frame in a normal position on said table.

75. In combination, a table adapted to support a tabulating sheet, a frame on said table, a case guided on said frame, and automatic means for raising said frame when said case reaches the end of its travel thereupon.

76. In combination, a table adapted to receive tabulating sheets, a transverse shaft mounted on said table, a frame rocking and sliding on said shaft transversely of said table, clips at one end of said frame, normally supporting the same on said table, and a case moving on said frame and adapted to engage said clips to permit the adjacent end of said frame to drop, whereby the opposite end of said frame is raised.

77. In combination, a table adapted to receive tabulating sheets, a transverse shaft mounted on said table, a frame rocking and sliding on said shaft transversely of said table, clips at one end of said frame, normally supporting the same on said table, a case moving on said frame and adapted to engage said clips to permit the adjacent end of said frame to drop whereby the opposite end of said frame is raised, and means for interlocking the said opposite end of said frame with said table to prevent transverse movement of said frame.

78. In a machine of the class described, a case, a depressible frame therein, a plurality of counting wheels, a shaft on said frame carrying the same, means for depressing said frame to print, said case having a slot in the wall thereof, a stem passing through said slot, and mechanism actuated by said stem for setting said wheels to zero.

In testimony whereof I have signed my name to this specification in the presence of two subscribing witnesses.

BENJAMIN HOSKINS.

Witnesses:
J. M. SMALLEY,
T. H. WILLSON.